United States Patent Office 3,590,007
Patented June 29, 1971

3,590,007
PROCESS FOR REGENERATION OF SPENT
HYDROCONVERSION CATALYST
Hans U. Schutt, Lafayette, Calif., assignor to Shell Oil
Company, New York, N.Y.
No Drawing. Continuation-in-part of application Ser. No. 725,194, Apr. 29, 1968. This application Mar. 12, 1969, Ser. No. 806,704
The portion of the term of the patent subsequent to Jan. 26, 1988, has been disclaimed
Int. Cl. B01j 11/02, 11/76
U.S. Cl. 252—411                                    7 Claims

ABSTRACT OF THE DISCLOSURE

A process for non-oxidative regeneration of coked hydroconversion catalysts characterized by incorporating a hydrogenation metal compound on a coked catalyst (preferably in situ) and contacting with hydrogen and hydrogen sulfide followed by contacting with hydrogen and elevated temperature.

REFERENCE TO CO-PENDING APPLICATION

This application is a continuation-in-part of application Ser. No. 725,194, filed Apr. 29, 1968.

BACKGROUND OF THE INVENTION

Field of the invention

This invention relates to a novel non-oxidative regeneration technique for removal of carbonaceous deposits and nitrogen poisons from hydroconversion catalysts. More particularly, it relates to an effective non-oxidative method for removing coke and nitrogen poisons from supported hydrogenative metal catalysts by depositing on the coked catalyst a hydrogenatvie metal compound followed by contact with a gaseous mixture of hydrogen and hydrogen sulfide followed by contact with hydrogen substantially free of hydrogen sulfide. The process of the invention, which is preferably conducted in situ in the hydroconversion zone, obviates many difficulties of oxidative regeneration techniques.

Catalyst composites containing hydrogenative metal compound components supported on refractory oxide supports are widely used in the petroleum refining industry. For many applications the support is either acid-acting or has induced acidic properties, as by incorporation of a halogen component. The catalysts lose some or all of their activity after a period of continued use, the rate of deactivation depending to a large extent upon the conversion conditions and the character of feedback employed. This loss in catalytic activity is generally attributed to several factors that occur within the reaction zone. One of the deactivation effects is due to the formation of carbonaceous deposits on the catalyst. The deactivating effect of coke is due largely to physical masking of the catalytic sites within and on the catalyst. Removal of coke from a coke-deactivated catalyst can generally be accomplished by burning the coke in the presence of an oxygen-containing gas at elevated temperatures.

Another type of deactivation results from the deposit and build-up of nitrogen-containing compounds on the catalyst. Petroleum fractions used as feedstock in hydrofining and hydrocracking and the like contain varying concentrations of organic nitrogen-containing compounds. Nitrogen compounds, generally basic in nature, titrate the acidic sites of the catalyst, thereby neutralizing the catalytic acidity necessary for the desired conversion reaction. Nitrogen compounds, like coke, can be removed from the catalyst by oxidative regeneration.

However, as is well known, oxidative regeneration is as a rule detrimental to the overall life of a catalyst to the extent that after several regenerations the catalyst must be discarded. The formation of water during oxidative coke-removal subjects the catalyst to steam at high temperature which is known to be a deactivating influence. Moreover, in addition to the possible permanent damage to the catalyst per se various other difficulties are encountered in commercial application of oxidative regenerations. Before oxygen can be introduced for regeneration, hydrogen must be exhaustively removed from the reactor system. In addition, oxygen must be carefully injected to prevent uncontrolled burning which would result in extremely high spot temperatures causing damage to the catalyst and reactor. This problem is particularly serious in large commercial reactors where flow maldistribution is likely. Thus, considerable time is required to effect a complete oxidative regeneration and in reaction systems where catalyst deactivation is severe—because of operating conditions and/or high coking feedstock—there is great incentive for a non-oxidative means for removing deleterious catalyst deposits and restoring catalyst activity.

The present invention is directed to a non-oxidative regeneration process which effectively removes both coke and nitrogen poisons from spent catalyst.

SUMMARY OF THE INVENTION

In broad aspect the present invention is a process for regenerating coked hydroconversion catalysts characterized by incorporating on a spent, coked catalyst a minor amount of a hydrogenation metal compound and contacting the catalyst with a reductive gas mixture at a temperature above about 600° F.

By hydroconversion catalysts is meant catalysts comprising a hydrogenative metal component disposed on a solid refractory oxide support such as catalysts used for various hydrogenation-conversion reactions including hydrocracking, isomerization and hydrotreating (dentrification, desulfurization and dearomatization, etc.) and the like.

The present invention is to be distinguished over present methods of manufacturing catalyst by incorporating metals into catalyst supports and methods of presulfiding such catalyst before use. In preparing the original catalysts, metals incorporated into the support are generally converted to the oxide or sulfide form before use. In the present invention, spent catalyst having deleterious deposits of coke and in many cases other catalytic poisons from use in the conversion process are regenerated by incorporating a metal compound on the coked catalyst followed by contact with a reductive gas. The incorporated metal is deposited on the coke which in turn is on the catalyst particles.

In one embodiment of the invention the reductive gas comprises hydrogen and hydrogen sulfide. Such a reductive treatment is particularly applicable to catalysts which contain as the hydrogenation component a metal sulfide in which case the additional advantage of eliminating the need for resulfiding the regenerated catalyst is obtained. Especially suitable are catalysts containing metals of Group VIII and Group VI or mixtures thereof, supported on refractory oxide solid supports, such as alumina, silica, magnesia, zirconia, thoria, etc., and mixtures thereof. Sulfided nickel and tungsten on a silica-alumina support is a specific example of a hydrofining or hydrocracking catalyst for which the process of the invention is especially appropriate.

Hydrogen sulfide in the reductive gas helps maintain the metal in the sulfide state and reduces the tendency of the metal component to agglomerate or sinter—a process which reduces available catalytic metal surface to the detriment of catalytic effectiveness. It is to be noted that used catalysts have, in many instances, already been exposed to sulfur (from presulfiding or from organic sulfides in the hydrocarbon feed) prior to the regeneration treatment of the invention.

It has been found advantageous, when using hydrogen and hydrogen sulfide as the reductive gas, that the catalyst be contacted, or stripped, with a substantially hydrogen-sulfide-free gas containing hydrogen after contact with the hydrogen sulfide-containing mixture.

It has been found especially advantageous to subject a coked deactivated catalyst to a first hydrogen stripping, followed by contact with hydrogen and hydrogen sulfide which is in turn followed by a subsequent hydrogen stripping.

This three step procedure is thus a preferred embodiment of the present invention. The first hydrogen stripping removes hydrocarbon and initiates hydrogenation of the more easily removed coke.

The use of hydrogen sulfide enhances the coke removal as well as maintaining the catalyst in its sulfided state. However, it has been discovered that superior performance is obtained and overall catalyst efficiency is improved if the catalyst is stripped to remove excess sulfur which it accumulates during the $H_2/H_2S$ treatment. By this treatment the sulfur on the catalyst will not be completely removed, i.e., the catalyst will not be reduced completely to the metallic form but will have a more suitable balance of catalytic activities.

The hydrogen gas treatment can be carried out under the same conditions as the contact with $H_2/H_2S$ mixture.

Any suitable hydrogenation metal compound may be used to effect hydrogenative coke removal. Metals from Group IV, Group VI and Group VIII or the Periodic Table of Elements are particularly appropriate.

The metal can be deposited on the spent catalyst by any means known to the art for depositing metals or metal compounds on solids. However, it is of particular advantage to treat the catalyst in the reactor where the conversion reactions take place. It is also desirable, but not essential, that the metal be incorporated from a non-aqueous medium since the presence of water has unfavorable effects on catalyst properties. For example, metal can be deposited on the spent catalyst by flooding a catalyst bed with a non-aqueous solvent containing the desired hydrogenative metal salt. Alternatively, metal can be deposited by including an appropriate metal salt or metal porphyrin in a hydrocarbon feedstock immediately prior to regeneration under conditions such that the metal is deposited throughout the catalyst bed. The catalyst can also be impregnated with metal from a gas using a metal compound which is volatile at the desired impregnation temperature, as for example, tin tetrachloride which vaporizes at about 215° F. or molybdenum carbonyl which decomposes thermally at relatively low temperature to yield molybdenum metal. Of course, the catalyst may be removed from the reactor, impregnated and regenerated.

In general, only a minor amount of deposited metal in the range of about 0.01% to about 5% by weight basis spent catalyst is sufficient to enhance coke removal. It is not desirable to use metal in excess of that required to accomplish the desired result since excessive metal may tend to influence the catalyst behavior in subsequent operating cycles. Usually about 0.01–1% by weight metal, basis spent catalyst is suitable.

Contact of the catalyst with the reductive gas mixture should be at an elevated temperature, i.e., about 600° F., and preferably 800° F. or higher. High temperatures apparently are more beneficial and tend to reduce the time and amount of gas necessary to effect the regeneration. Temperatures higher than about 1200° F. should normally be avoided to minimize possible damage to the catalyst. Preferably the treatment should be effected below 1100° F.

The regeneration gas treatment must be effected at elevated pressures. Generally, the treatment will be effected at pressures normally used in the conversion reaction, e.g., about 500–2500 p.s.i.g. The use of high pressures such as those employed in the conversion reaction, results in relatively high mass flow rates which decreases the time required for the regeneration treatment and, of course, avoids the necessity of changing pressure for regeneration. In general, for good results, the treatment is carried out until at least 1000 standard cubic feet of gas is used per cubic foot of catalyst. While higher volumes of gas, e.g., up to about 100,000 s.c.f./cubic foot of catalyst and higher can be used, it is preferred to use about 5000 to 100,000 standard cubic feet per cubic foot of catalyst.

As already mentioned, it is desirable to include hydrogenation sulfide in the reductive gas, especially where the catalytic metal is in the sulfide form. The amount of hydrogen sulfide in the reductive gas mixture should be at least about 1% by weight and preferably about 10% by weight. Concentrations of hydrogen sulfide as high as 50% by volume or more may be used but generally a concentration of 5–20% is suitable. The especially preferred treatment is to contact the catalyst within a three step $H_2/H_2$–$H_2S/H_2$ sequence.

DESCRIPTION OF PREFERRED EMBODIMENTS

The regeneration process of the present invention is especially suitable for regeneration of spent hydrocracking catalysts which are subject to nitrogen poisons since the treatment not only removes coke deposits but removes deposited nitrogen compound poisons as well. Illustrative of the application of the present process is its use for restoring activity to nickel-containing hydrocracking catalysts which have become deactivated by accumulated coke and nitrogen deposits. Such catalysts contain nickel incorporated into a siliceous component such as, for example, silica-alumina and may be additionally promoted with a halogen compound and one or more transitional metals, such as cobalt, molybdenum, tungsten, silver, etc., and activated by sulfiding prior to use.

The catalyst gradually becomes deactivated during use. The temperature is customarily raised to maintain constant conversion to cracked products, for example, gasoline. When a predetermined temperature limit is reached as dictated by mechanical limitations, catalyst properties and conversion selectively degradation, the catalyst must be regenerated.

In one embodiment of the present invention, the regeneration is effected by discontinuing the feed and contacting the catalyst bed with a gas containing a vaporized hydrogen compound. Alternatively, the feed is discontinued; the reactor cooled and flooded—as by back-flushing with a solution of a metal salt.

After metal incorporation, the catalyst is contacted with hydrogen-containing gas which is substantially free of $H_2S$, then with a mixture of hydrogen and hydrogen sulfide at a temperature of at least 600° F. and below about 1100° F. For example, the existing process hydrogen circulation system can be used for the initial stripping and then hydrogen sulfide added. This hydrogen/hydrogen sulfide gas treatment is continued until at least about 1000 standard cubic feet of gas is used per cubic foot of catalyst, after which the catalyst is contacted with a hydrogen containing gas which is substantially free of hydrogen sulfide. For example, the addition of hydrogen sulfide is simply discontinued prior to reintroduction of oil.

The use of hydrogen sulfide in the regeneration gas makes resulfiding of the catalyst unnecessary and the hydrocracking operation may be immediately resumed upon completion of the reductive regeneration. This is true even when the catalyst has been stripped with hydrogen following the hydrogen/hydrogen sulfide gas contacting.

The obvious advantages of the present reductive regeneration procedure over oxidative regenerations will be immediately obvious to those skilled in the art as will the various means of employing the present process to maximum advantage in a particular circumstance.

The following examples will further illustrate the practice and advantages of the present invention, but are not to be taken as a limitation thereof.

EXAMPLE I

A series of experiments were carried out to illustrate the effectiveness of the regeneration procedure of the invention.

The catalyst used was a nickel/tungsten/fluoride on silica-alumina which contained 4.7% by weight Ni, 3.2% by weight W, 3.2% by weight fluorine, prepared by incorporating the metal and fluoride into a hydrogel of silica-alumina. The catalyst, after sulfiding, was used for hydrocracking gas oils, in which operation it became deactivated by accumulation of more than 5% by weight carbon (as coke) and 0.13% by weight nitrogen.

Portions of the catalyst were subjected to reductive regeneration by contact with hydorgen containing 10% by volume hydrogen sulfide at 950 volumes of gas/volume of catalyst/hour, 1800 p.s.i.g. for a period of 48 hours at temperatures of 707° F. and 932° F. The results are shown in Table 1.

Other portions of the catalyst were impregnated with various amounts of nickel, molybdenum and tin compounds followed by contact with hydrogen and hydrogen sulfide mixtures at various conditions. The results of these experiments are given in Table 1 together with the conditions employed. Nickel and molybdenum were impregnated with solutions of the metal acetylacetonate in dimethyl disulfide and tin was impregnated from a solution of tin tetrachloride in dimethyl disulfide.

The results of these experiments clearly demonstrate the advantages of the invention.

EXAMPLE II

The advantage of incorporating a hydrogenation metal compound on the spent catalyst prior to treatment with the reductive gas is illustrated in the following experiment.

Two samples of the spent catalyst of Example I (containing about 5% by weight coke) were regenerated. The first sample was impregnated with about 1.3% by weight molybdenum from a solution of molybdenum acetylacetonate in dimethyl-disulfide and then contacted with a gas mixture of hydrogen containing 10% by volume hydrogen sulfide at 1800 p.s.i.g. and 932° F. for 40 hours. The gas flow rate was about 950 cc./cc. catalyst/hour.

The second sample was not impregnated with metal but otherwise treated in an identical manner.

These regenerated catalysts were tested for hydrocracking a catalytically cracked gas 0 at 1500 p.s.i.g. hydrogen pressure and 0.67 LHSV (volume feed/volume of catalyst/hour). The temperature required to obtain about 67% conversion of gas oil to gasoline after about 80 hours of operation was 558° F. for the impregnated catalyst and 592° F. for the unimpregnated catalyst. These results also demonstrate the effectiveness of the regeneration method of the invention.

EXAMPLE III

In another experiment, a portion of the spent catalyst of Example I was impregnated with about 0.1% by weight molybdenum (from molybdenum acetylacetonate in dimethyl-disulfide) and contacted with 7.5% by volume $H_2S$ in $H_2$ at 932° F. for 50 hours. The regenerated catalyst was tested for continuous recycle hydrocracking of a mixed catalytically cracked gas oil feed at 1800 p.s.i.g. 0.67 LHSV (volume of liquid feed/volume catalyst/hour). After about 50 days of operation the temperature required to obtain 67% conversion to gasoline was 624° F. This compares with a temperature requirement of about 600° F. for fresh catalyst presulfided at 932° F. and tested under the same conditions. Thus, the reductive regeneration substantially restores catalyst activity even at a very low level of impregnated metal.

TABLE 1

| Impregnate | Regeneration conditions | | $H_2S$ concentration in $H_2$ regeneration gas, vol. percent | Carbon on catalyst, wt. percent | Nitrogen on cata. lyst, wt-percent |
|---|---|---|---|---|---|
| | Temperature, °F | Pressure, p.s.i.g. | | | |
| Spent catalyst before regeneration | | | | 5.0 | 0.13 |
| None | 707 | 1,800 | a10 | 2.9 | 0.09 |
| Do | 932 | 1,800 | a10 | 2.3 | 0.01 |
| 0.5 wt. percent Ni | 707 | 1,800 | 10 | 2.1 | 0.09 |
| 0.5 wt. percent Ni | 932 | 1,800 | 10 | 0.8 | 0.01 |
| 1.3 wt. percent Mo | 932 | 1,800 | a10 | b0.7 | 0.01 |
| 0.7 wt. percent Mo | 707 | 1,800 | 10 | 1.8 | 0.06 |
| 0.7 wt. percent Mo | 932 | 1,800 | 10 | 0.6 | 0.01 |
| 0.05 wt. percent Mo | 932 | 1,800 | 7.5 | 0.3 | 0.02 |
| 0.01 wt. percent Mo | 932 | 1,800 | 7.5 | 0.4 | 0.02 |
| 0.05 wt. percent Mo | 932 | 900 | 7.5 | 1.4 | 0.02 |
| 0.05 wt. percent Sn | 932 | 1,800 | 7.5 | 0.6 | 0.002 |
| 0.01 wt. percent Sn | 932 | 1,800 | 7.5 | 1.2 | 0.002 |
| 0.05 wt. percent Sn | 932 | 900 | 7.5 | 1.5 | 0.005 |
| 0.01 wt. percent Sn | 932 | 900 | 7.5 | 1.6 | 0.002 | a Regeneration gas flow was 950 volume of gas/volume of catalyst/hour for 40 hours. All other experiments carried out at 1,400 volumes of gas/volume of catalyst/hour for 50 hours.
b Carbon level measured after 80 hours of resumed hydrocracking test.

EXAMPLE IV

A hydrocracking catalyst containing 0.6% by weight Mo, 6% by weight Ni and 2% F was used to hydrocrack a catalytically cracked heavy gas oil which had been hydrotreated to reduce the organic nitrogen level to 3 p.p.m. by weight. The hydrocracking was carried out at 1500 p.s.i.g., 0.67 LHSV and 10/1 $H_2$/oil mole ratio with temperature adjusted to give a conversion of 67% to products boiling lower than the feed. During the run 1% by weight sulfur was added to the feed.

After 80 hours of operation the temperature required was bout 519° F.

Following a period of operation a portion of this catalyst was regenerated by contact (after oil had been discontinued) with a gas mixture containing 10% $H_2S$ in hydrogen at 250 volumes of gas/volume of catalyst/hour at 500° C. for 50 hours. The hydrocracking operation was resumed at the same conditions. The temperature required to obtain 67% conversion after 80 hours of operation was 537° F., indicating a lower activity than would be expected for a catalyst having had the coke removed. Therefore the oil was discontinued and the catalyst contacted with $H_2$ (containing no $H_2S$) for 43 hours at 500° C. at a rate of 500 vol./vol./H₂. On resuming the hydrocracking operation the temperature required for 67% conversion after 80 hours was 530° F. indicating that the hydrogen contacting is effective in restoring activity loss which may be attributed to the accumulation of excess sulfur by the catalyst.

I claim as my invention:

1. In a non-oxidative process for regenerating hydroconversion catalysts selected from the group consisting of metals and compounds of Group VI and Group VIII and mixtures thereof on a refractory oxide support which have become deactivated by accumulation of coke, the improvement comprising (1) impregnating a hydrogenative metal compound selected from the group consisting of metals from Group IV, Group VI and Group VIII in a non-aqueous medium on the deactivated catalyst. (2) contacting the catalyst with a reductive gas consisting essentially of hydrogen containing 1% to 50 percent by volume hydrogen sulfide at a temperature of at least 600° F. to below about 1100° F., and (3) then contacting the catalyst with a substantially hydrogen sulfide free hydrogen containing gas to remove excess sulfur.

2. The process of claim 1 wherein at least about 1000 standard cubic feet of reductive gas is used per cubic foot of catalyst.

3. The process of claim 2 wherein the impregnated metal is molybdenum.

4. The process of claim 1 wherein the catalyst is first contacted with a substantially hydrogen sulfide free hydrogen containing gas prior to contact with the hydrogen-hydrogen sulfide reductive gas.

5. The process of claim 4 wherein at least about 1000 standard cubic feet of reductive gas per cubic foot of catalyst is used.

6. The process of claim 4 wherein the deposited metal is molybdenum.

7. The process of claim 1 wherein the catalyst is a hydrocracking catalyst.

References Cited

UNITED STATES PATENTS

| | | | |
|---|---|---|---|
| 2,317,494 | 4/1943 | Thomas | 252—411X |
| 3,048,536 | 8/1962 | Coonradt et al. | 252—411X |
| 3,113,097 | 12/1963 | White et al. | 252—411X |
| 3,236,782 | 2/1966 | Koch | 252—411 |
| 3,240,698 | 3/1966 | Leak et al. | 208—110X |
| 3,259,588 | 7/1966 | Harvey et al. | 252—412X |
| 3,459,675 | 8/1969 | Crecelius et al. | 252—411 |

DANIEL E. WYMAN, Primary Examiner

P. E. KONOPKA, Assistant Examiner

U.S. Cl. X.R.

208—111; 252—412, 414